United States Patent [19]

Horensky et al.

[11] Patent Number: 5,330,085
[45] Date of Patent: Jul. 19, 1994

[54] VISOR LOCATED ACCESS CARD HOLDER

[76] Inventors: Robert I. Horensky; R. Douglas Horensky, both of 11778 Frederick Rd., Ellicott City, Md. 21042

[21] Appl. No.: 993,232

[22] Filed: Dec. 17, 1992

[51] Int. Cl.$^5$ ............................................... B60R 7/05
[52] U.S. Cl. .................................. 224/312; 224/252; 224/277
[58] Field of Search .................. 224/277, 312, 252; 40/643, 644, 666, 593; 24/3 F, 3 G, 3 J, 3 L

[56] References Cited

U.S. PATENT DOCUMENTS

| | | | |
|---|---|---|---|
| D. 310,301 | 9/1990 | Burrow | 224/312 |
| 2,531,295 | 11/1950 | Ritchie | 224/312 |
| 3,016,262 | 1/1962 | Hunt | 224/312 |
| 5,114,061 | 5/1992 | Brady | 224/252 |

*Primary Examiner*—Linda J. Sholl
*Attorney, Agent, or Firm*—Peter Gibson

[57] ABSTRACT

A device intended to be removably attached to an automobile sun visor having a pocket for the safe and convenient storage of a plastic access card is disclosed. Said device is constructed of a plurality of rectangular sheets of equal size and a clip comprised of a thin, planar, rigid, substantially rectangular base and a resilient member of constant thickness and width projecting from the base having an arcuate portion then extending towards an edge of the base with an inclination towards the plane of the base such that the free end of the clip is in close proximity to the plane of the base as well as said edge of the base. The base is eider held within first and second opposed plastic sheets fixedly attached to each other along the edges or fixedly attached directly to the second sheet. A third plastic sheet is attached on three edges to the second sheet; the fourth unattached edge provides an aperture of a size suitable for insertion and removal of a plastic access card. The clip member extending from the base projects through an aperture in the first sheet of plastic, if used, opposite the second and third sheets defining the pocket, and is entirely exposed. The clip member is shaped such that the arcuate portion provides the portion extending longitudinally with a resilience in the direction normal the base such that secure but removable attachment to an automobile sun visor is enabled.

20 Claims, 2 Drawing Sheets

FIG 1
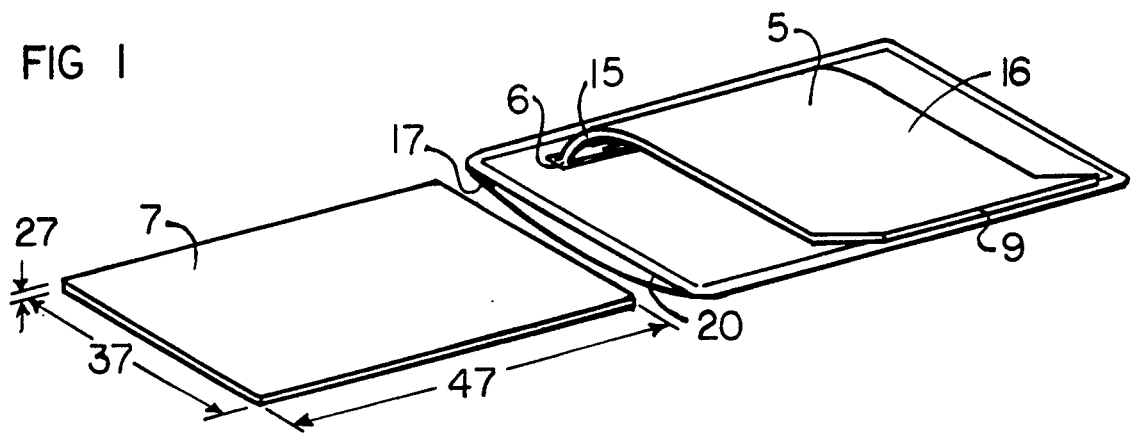
FIG 3
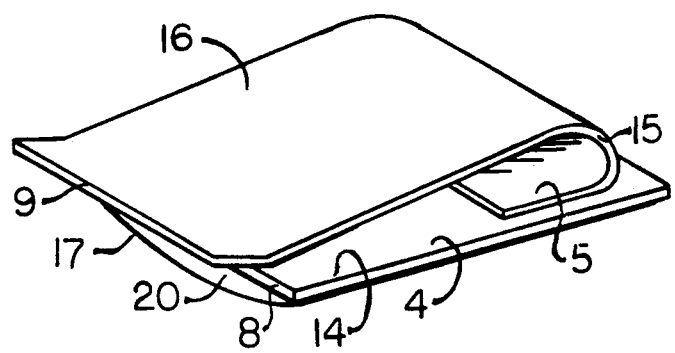
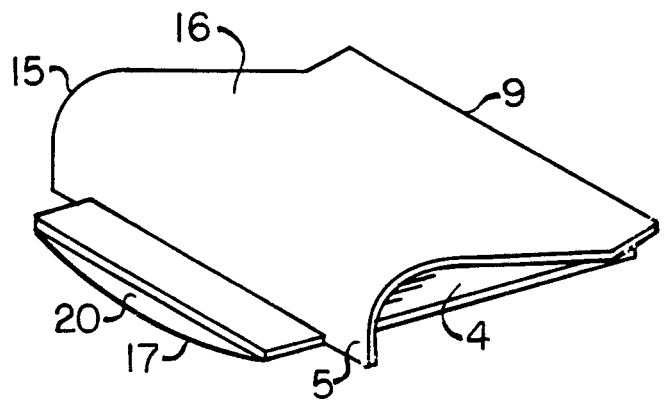
FIG 4

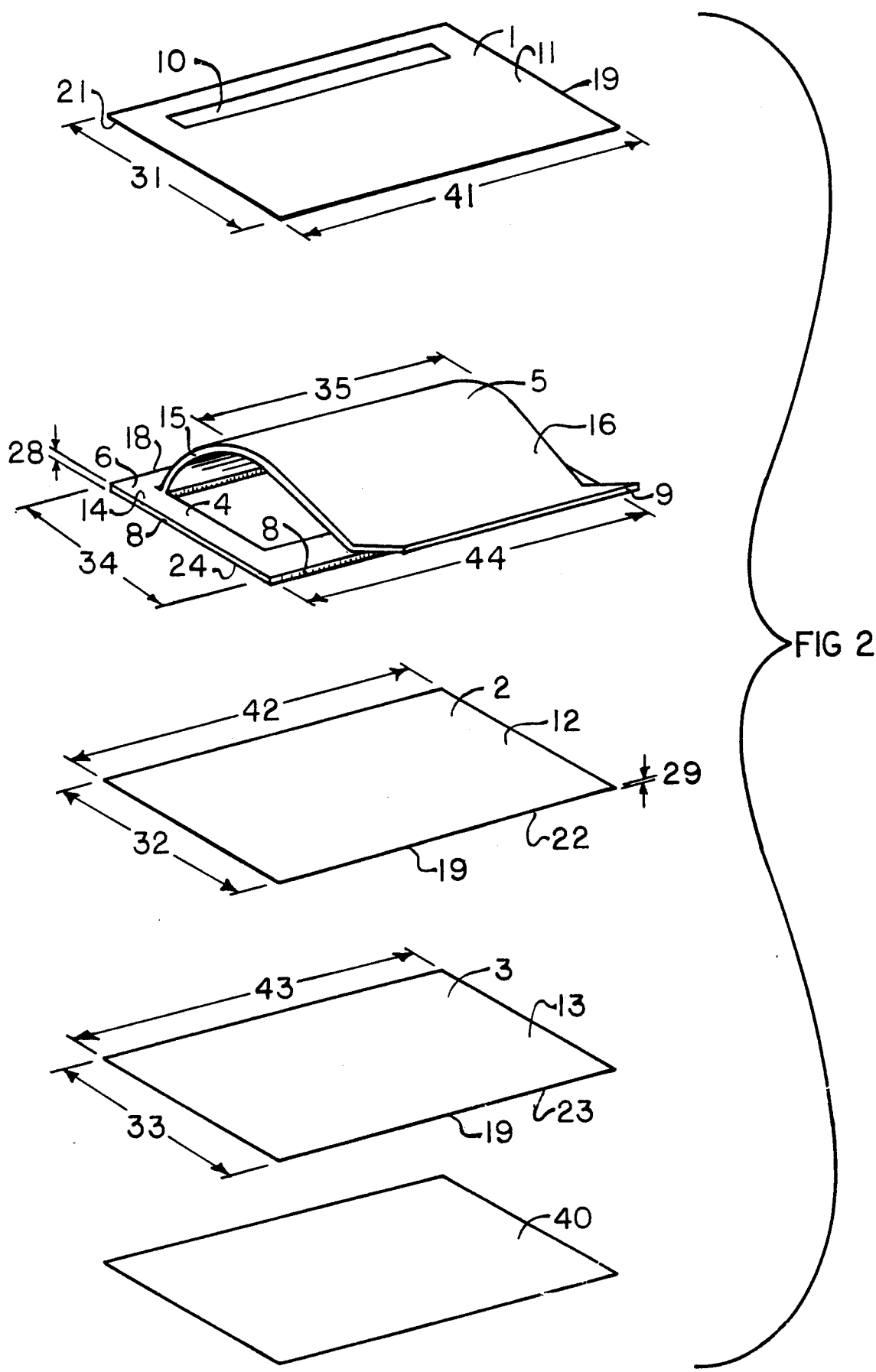

VISOR LOCATED ACCESS CARD HOLDER

BACKGROUND OF THE INVENTION

The present invention relates to devices attached to automobile sun visors, particularly to those having a pocket for convenient storage of articles and specifically to those designed for the storage of cards. While there is a considerable history of devices intended for attachment to automobile sun visors for the storage of articles in pockets, most of these were intended for multiple uses and have, therefor, a plurality of laterally disposed pockets. Many such devices are removably attached to the visor by some type of strap encircling the visor. The use of clips is known in the art, but not as an integral portion of the main body. Devices are also known having a single compartment, but only for the permanent display of a document.

The relatively recent proliferation of devices controlling access to parking lots and other such areas utilizing a plastic card having magnetically transferred coded information to operate the devices and permit access to the restricted areas has engendered the need for a device that will store this type of card safely and conveniently for drivers of automobiles. These access cards must retain a certain rigidity to remain effective in use as well as retain the coded information read by the controlling devices. These two essential properties may be lost by the heat generated either by the rays of the sun or by the automobile if the access card is left in a location vulnerable to said heat sources. Also, accidental bending of the card and other mishaps deriving from location of the card in an unsuitable place readily result in distortion of the card. Frequently these cards are often without a definite location and are subsequently misplaced or lost. Furthermore, these cards are typically left in a wallet, pocketbook or glove compartment which placement occasions inconvenience in locating and or retrieval of the access card to the driver of said automobile and to any other drivers queued behind.

It is thus seen that a need exists for a device located upon an automobile sun visor which will safely and conveniently store cards used in gaining access to a controlled area entered by automobiles.

SUMMARY OF THE INVENTION

The purpose of the present invention is to provide a secure, safe, convenient location for a standard plastic access card, i.e. a card read by a machine controlling access to an area automobiles enter, such as a parking lot. Further, it is the purpose of the present invention to provide said access card location in a pocket of appropriate size to the standard access card in an economic device which may be removably attached to the sun visor typically found directly above the windshield in the interior of an automobile. An embodiment of the principles relating to the present invention consists of a device intended for this purpose comprising a clip comprised of a clip member and a base constructed of plastic attached to at least one of at least two layers of sheet plastic so attached to one another as to provide a pocket of appropriate size for a standard plastic access card. Said sheets of plastic are each of approximately equal width and are substantially rectangular in shape. One sheet of plastic is aligned in parallel with and fixedly attached to another plastic sheet along two aligned edges, leaving at least one pair of aligned plastic sheet edges unattached which together comprise an aperture of appropriate size for insertion and removal of a standard plastic access card as well as a otherwise enclosed interior of substantially rectangular and planar dimensions appropriate to the size of a standard plastic access card. Said base is substantially flat and rigid in comparison with said plastic sheets. Said clip member projects from said base, has an arcuate portion in proximity of the juncture of said clip member with said base and a substantially flat portion extending with a small inclination from said arcuate portion towards said base terminating in an edge proximate the surface and an edge of said base. Said clip member further has a degree of flexibility greater than said base and a resilience with respect to displacement in a direction normal to said base sufficient to admit the width of a standard automobile sun visor and the exertion of a compressive force between said clip member and base upon the opposed surfaces of an automobile sun visor sufficient to retain the device in position of removable attachment to said sun visor.

BRIEF DESCRIPTION OF THE DRAWINGS

FIG. 1 is a perspective drawing illustrating an access card and a preferred embodiment of principles relating to the present invention wherein three sheets of plastic are employed and a single pocket has one open edge parallel to the longitudinal axis of the clip oriented in a left hand position.

FIG. 2 is an exploded perspective drawing illustrating an embodiment of principles relating to the present invention wherein a plurality of plastic sheets are employed.

FIG. 3 is a perspective drawing illustrating an embodiment of principles relating to the present invention wherein the clip member is fixedly attached to the base and the pocket opening shown is perpendicular to the longitudinal axis of the clip member.

FIG. 4 is a perspective drawing illustrating an embodiment of principles relating to the present invention wherein the clip member is of a width exceeding the width of the base and the pocket opening shown is perpendicular to the longitudinal axis of the clip member.

DETAILED DESCRIPTION OF THE INVENTION

It is the express purpose of the present invention to conveniently, safely and discreetly store a standard plastic access card upon an automobile sun visor where said card will be kept away from heat generated by either the rays of the sun or the automobile, where said access card may be easily retrieved by the driver of an automobile when required and where said access card is, further, safe from danger of folding or bending. It is further the express purpose of the present invention to possess means for removable attachment to an automobile sun visor in order to locate an access card away from sources of heat and within convenient reach of the driver of the automobile.

In the preferred embodiments relating to the principles of the present invention described herein, as seen in FIGS. 1-4, a clip 6 is comprised of a comparatively rigid base 4 and a comparatively flexible clip member 5 between which an edge of an automobile sun visor is slid in order to locate the device of the present invention for use. The clip 6 grips the sun visor with sufficient force to retain the device in position, without causing undue distortion of, or difficulty in detaching from, the sun visor. A device made in accordance with the principles relating to the present invention further possesses a rigidity ideally surpassing that of a standard plastic access card. As seen in FIG. 2, the base 4, therefore, possesses a thickness 28 exceeding the thickness of the sheets 29 and preferably exceeding the access card thickness 27 shown in FIG. 1 but not so great as to prevent the normal range of visor movement, especially in regard to placing the visor flush against the windshield or interior roof of an automobile.

In all the embodiments of principles relating to the present invention the clip member 5 projects from the base 4, then possesses an arcuate portion 15 proximate the juncture of the clip member with said base. The clip member 5 further possesses a substantially linear extension 16 which possesses a small inclination with respect to first, upper planar surface 14 of the base 4, seen in FIG. 2, taken from the arcuate portion 15 to an elevation within proximity of the first, upper surface 14 of the base 4. The free end 9 of the clip member 5 is shown in FIGS. 1-4 as possessing a reverse, or dihedral, inclination away from the base 4. This is a common feature to clip design and facilitates the admission of an edge of an automobile sun visor. This reverse inclination is not necessary to the embodiment of principles relating to the present invention, but possesses obvious utility. It is necessary, however, that the free end 9 of the clip member 5 be a substantially linear edge, however, proximate one substantially linear edge 8, seen in FIGS. 1 & 3, of the base 4 in order to facilitate admission of the visor into the clip. Ideally, as in many clips, the point at which the inclination reverses corresponds closely with the base edge and is closest with the proximate opposed surface at this point.

FIG. 1 illustrates an assembled version and FIG. 2 the construction of a preferred embodiment of principles relating to the present invention employing three plastic sheets 1, 2 & 3 wherein the first sheet 1 is located directly above, parallel to and in planar alignment with the first, upper surface 14 of the base 4 such that the second surface 21 of the first sheet faces the first surface 14 of the base. The first sheet 1 further has an aperture 10 through which the clip member 5 projects from the base 4. This clip member 5, together with the base 4 comprise the clip 6. The base 4 possesses an aggregate perimeter 18 substantially rectangular in shape. The first, second and third sheets of plastic 1, 2 & 3, respectively possess four substantially linear edges, 19 and are rectangular in shape as well. Furthermore, the base 4 and the sheets of plastic 1, 2 & 3 approximate the dimensions of a standard plastic access card 7. The base width 34 approximates the access card width 37 and the base length 44 approximates the access card length 47. The first sheet width 31, second sheet width 32 and third sheet width 33 are substantially constant and must necessarily exceed slightly the access card width 37. The first sheet length 41, second sheet length 42 and third sheet length 43 must be sufficient to accommodate a substantial portion of the access card length 47.

In the first preferred embodiment illustrated in FIG. 1 the second sheet of plastic 2, as seen in the construction illustrated in FIG. 2, is located directly below the bottom surface 24 of the base 4 such that the first planar surface 12 of the second sheet faces the second, bottom surface 24 of the base. The second sheet 2 is in alignment with the first plastic sheet 1 and the four edges 19 of the first and second sheets are fixedly attached in common, aligned pairs and may be attached to the base perimeter 18 as well. The third sheet 3 is located directly below the second sheet 2, in planar alignment such that the first planar surface 13 of the third sheet faces the second planar surface 22 of the second sheet. Furthermore, the third plastic sheet 3 is attached, in this first preferred embodiment, to the second plastic sheet 2 along three of the four edges 19 common to both sheets. This arrangement leaves one open edge 17 of a width sufficient to admit passage of a standard plastic access card 7 which, in storage, is located in the pocket 20 between the second and third sheets of plastic 2 & 3.

It is not necessary to employ three sheets of plastic in order to adhere to the principles relating to the present invention. The embodiments of principles relating to the present invention illustrated in FIGS. 3 & 4 employ only two sheets of plastic, the second sheet 2 and third sheet 3, seen in FIG. 2. Both of these sheets are required to form a pocket 20 wherein an access card 7 may be stored. In this embodiment, the base 4 of the clip 6 must be fixedly attached to the second plastic sheet 2. The third plastic sheet 3 is attached to the second sheet 2 along three common edges 19, as in the first preferred embodiment illustrated in FIG. 1. In the cases shown in FIGS. 3 & 4, the pair of aligned open edges forming a pocket aperture 17 are perpendicular with respect to the longitudinal axis of the clip member 5.

In the same manner described above, additional pockets may be added in planar alignment by the attachment of additional sheets of plastic. In FIG. 2, a fourth sheet 40 of plastic is seen in planar alignment with the first, second and third sheets 1, 2 & 3 of plastic and may be attached to the third sheet 3 in the same manner as the third sheet 3 is attached to the second sheet 2 leaving at least one pair of aligned edges free to form both an additional pocket and a pocket aperture for said additional pocket. Obviously, additional sheets may be similarly attached to form additional pockets in the same manner. Adherence to the principles relating to the present invention places no restriction upon the number of sheets of plastic used nor upon the number of pockets formed, however, it is necessary that the sheets employed and the pockets so formed be all in planar alignment.

Similarly, it is not necessary to have three of the four pairs of aligned edges 19 between the second and third plastic sheets 2 & 3 fixedly attached in order to adhere to the principles related to the present invention. Two aligned pairs of opposed edges 19 may be left unattached to leave opposed pocket apertures. In FIGS. 3 & 4 the pocket apertures are perpendicular the longitudinal axis of the clip member 5 but, as seen in FIG. 3, this aperture 20 is proximate the clip member free end 9 while in FIG. 4 the pocket aperture 20 is opposite this free end 9. It is readily understood that these two figures may illustrate the case wherein two opposed pocket apertures are found. Obviously, however, adjacent sheet edges 19 are not to be left unattached.

Also, without deviance from the principles relating to the present invention, the pocket aperture may be oriented in regard to the longitudinal axis of the clip member in any manner. FIG. 1 illustrates the first configuration, wherein the pocket aperture 17 is in a left hand position parallel to the clip member. Were the aperture upon the opposite side, a right hand version would be had. Both ends could also be open. As regards a pocket aperture 17 perpendicular the longitudinal axis of the clip member 5, FIGS. 3 & 4, as mentioned above, illustrate the three possible cases: upon the edge proximate the free end 9 of clip member 5, opposite this end or both. Again, it is unimportant whether two, three or more sheets of plastic are employed in construction.

It may be noted, that given any of the embodiments illustrated in FIGS. 1–4, the device illustrated will function in a right or left handed manner with respect to the driver. This depends upon whether the device is removably attached to either the front or rear longitudinal edges of the visor or in proximity to either the right or left hand lateral edges of the visor. In view of what may be considered the best method of constructing a device in accordance with the principles relating to the present invention, the express purpose of said invention is considered. A machine controlling access to a parking lot is situated such that the driver of an automobile must insert an access card in the machine via the open window of the door on the side of the driver, i.e. to the left hand side of the driver. In order to simplify, expedite and otherwise reduce this action to the easiest, quickest possible action it is considered that the access card may be retrieved with the left hand of the driver from a pocket attached to the bottom surface of the sun visor and inserted in the machine in essentially one motion, then retrieval the card from the machine and replacement of said card in the pocket so located upon the visor may be accomplished in the reverse of this same, single motion.

An automobile sun visor is more often in the 'up' position which exposes the bottom surface of the visor then in any other position. If the pocket were located on the upper surface of the visor, the visor would need to be lowered in order to retrieve the card. If the open edge of the pocket were located along the longitudinal edge of the sun visor an additional movement of the hand would be necessary to retrieve the card prior the movement necessary to insert the card in the machine. This, obviously is a rather fine point, but it is noted that location of the pocket and open edge of a device constructed and utilized in accordance with principles relating to the present invention upon the bottom surface and left hand lateral edge of a sun visor is considered optimal.

A consideration of the action of retrieval of the card from the pocket of a device constructed in accordance with the principles relating to the present invention leads one to consideration of another design aspect of said invention. The third plastic sheet 3 seen in FIG. 2 is that which is uppermost in regard to retrieval of the access card 7. If said sheet extends beyond the distal end of the card in relation to the pocket when said card is stored in said pocket, displacement of said sheet is necessary for retrieval of the card. If, however, the third plastic sheet 3 is of a length 43 somewhat less than that of the card, or if the length of the pocket is somewhat less than that of the card, the distal edge of the card in regard to the pocket when fully inserted in the pocket will protrude somewhat from said pocket and retrieval is more easily accomplished.

It is not considered desirable to have the edge of the access card, when stored fully inserted in the pocket of a device constructed according to the principles of the present invention, extend beyond the edge of the sun visor when correctly positioned. Therefore said construction is considered to be optimized in regard to this design aspect if the pocket length taken along the third plastic sheet 3 is somewhat less than the length 47 of a standard plastic access card while the length 42 of the second plastic sheet 2, the length 44 of the base 4 and the first sheet length 41, if a first sheet 1 is employed, is set at equal to or somewhat greater than the length 47 of a standard plastic access card. Adherence to this aspect of design will expose a portion of the face of the access card opposite the visor at the distal end of the card with respect to the depth of the pocket when the card is fully inserted in said pocket for storage.

The best method of manufacture of a device in accordance with the principles relating to the present invention is simple and readily plain to one practiced in the art. It is considered that the most economic method consists of forming the clip 6 with an injection molding process. The base 4 and clip member 5 may be of approximately equal thickness in accordance with the principles discussed above. The width 34 of the base 4 has been similarly discussed. The width of the clip member 5, however has been neglected. It is considered best to have the clip member width 25 be less than the base length if the clip member is parallel the pocket aperture 20, as seen in FIG. 1 and less than the width 34, as FIG. 3, wherein the clip member 5 is perpendicular the pocket aperture 20. But, as seen in FIG. 4, the width of the clip member 5 may exceed the width of the base 4 in a perpendicular arrangement and, by the same but even less desirable logic, the width of the clip member may exceed the length of the base in a parallel arrangement. Similarly, the base may have an open interior, as seen in FIG. 2 and by the same token, the clip member may also have an open interior. Both of these characteristics are unimportant to the principles relating to the present invention.

Similarly, it is unimportant whether the clip member 5 is of one piece with the base 4 or is attached as illustrated in FIG. 3. If attached, it is suggested that a clip member of metal be imbedded in the plastic forming the base 4, but attachment may be by any means suitable. A metal clip member embedded in the plastic forming the base would be quite satisfactory. In FIG. 3 a nominally plastic clip member is attached to the upper, first planar surface 14 of the base 4. Attachment is by any suitable means. Welding is recommended.

If the first sheet 1 is employed in construction, as in FIG. 1, it must have an aperture 10 of suitable size and location to admit the protrusion of the clip member 5 from the base 4. Having positioned the first sheet of plastic 1 in alignment with the second sheet 2, with the base 4 between the two sheets 1 & 2 with the clip member 5 protruding through the slot 10 in the first sheet 1, the four aligned edges 19 of the two sheets of plastic are fixedly attached by any suitable means. Welding is considered the best method of attachment. In this case the base is not necessarily attached fixedly to either plastic sheet and obviously the dimensions of the base must approximate the dimensions of the first and second sheets for satisfactory construction. Of course, the base may be attached to either the first and second sheets by any suitable means, such as an adhesive. Alternatively, the base may be fixedly attached to the second plastic sheet and the first sheet omitted altogether. Attachment by means of a suitable adhesive is recommended in this case.

Finally, the third plastic sheet 3 must be attached to the second sheet 2 along two opposed edges 19 if not three edges 19, leaving at least one open edge as an aperture 17 to the pocket 20. Again, welding is considered the best means. The dimensions of the various components have been discussed above and the materials specified as plastic. Polyvinylchloride is recommended for the plastic sheet. Polypropelene, ABS, another styrene or an acrylic plastic is recommended for injection molding of the clip.

Having described fully various preferred embodiments of the principle relating to the present invention including the method of construction considered to be the best, it is emphasized that the foregoing may not be construed as restrictive in any sense of the rights and privileges granted by Letters Patent for which we hereby claim:

1. A device intended for removable attachment to an automobile sun visor wherein provision is made for a pocket specifically intended for safe and convenient storage of a standard plastic access card;

said device comprising a plurality of plastic sheets and a clip, said plurality of plastic sheets comprising at least one first, one second and one third plastic sheet, said clip comprising a base and a clip member projecting from said base;

said base being substantially rectangular in aggregate perimeter with at least one substantially linear edge, possessing first and second planar surfaces and a width and a length approximating, respectively, the width and length of a standard plastic access card and further possessing a substantially constant thickness at least as great as the thickness of said access card;

said clip member projecting from said first surface of said base, possessing a thickness of lesser dimension than width further possessing an arcuate portion proximate the juncture with said base and a substantially planar portion extending from said arcuate portion at a small inclination with respect to said first surface of said base, terminating in an edge proximate to one said substantially linear edge of said base;

said clip member thereby possessing a flexibility comparative with respect to and in a direction normal to said base sufficient to admit the width of a typical automobile sun visor and a resilience in said direction normal to said base sufficient to exert a compressive force when displaced by the width of an automobile sun visor adequate to retain said device in a position of removable attachment to said automobile sun visor;

each of said plurality of plastic sheets being substantially rectangular in shape, each having first and second opposed planar surfaces and four substantially linear edges, each said sheet further possessing a width at least as great as the width of a standard plastic access card and a thickness less than the thickness of said access card;

each of said first and second plastic sheets further possessing both a width and a length slightly greater, respectively, than the width and length of said base, said first sheet possessing an aperture through which said clip member projects from the base and disposed in planar alignment with both said base and said second sheet such that said first sheet lies above said base, facing said first surface of the base and said second sheet lies below said base with said first surface of said second sheet facing said second surface of said base, said four edges of said first sheet and said four edges of said second sheet being aligned in four substantially linear pairs of edges fixedly attached such that said base is enclosed-between said fast and second plastic sheets;

said third plastic sheet disposed in planar alignment with said second sheet facing said second surface of said second sheet and having at least two opposed edges each attached to an aligned edge of said second sheet forming thereby a pocket between said second and third sheets, at least one edge of said third sheet having a free linear dimension at least equal to the width of a standard access card thus providing an aperture into said pocket between said second and third plastic sheets.

2. A device in accordance with claim 1 wherein said clip comprising said base and said clip member consists of a single molded piece of plastic.

3. A device in accordance with claim 1 wherein said base is constructed of plastic and said clip member is fixedly attached to said base.

4. A device in accordance with claim 1 wherein said pocket is perpendicular to the longitudinal axis of said clip member.

5. A device in accordance with claim 1 wherein said pocket is parallel to the longitudinal axis of said clip member.

6. A device in accordance with claim 1 wherein a plurality of pockets in planar alignment each appropriate for the storage of an access card substantially similar to said pocket between said second surface of said second sheet and said first surface of said third sheet are provided by the attachment of plastic sheets additional to said first, second and third sheets in a manner substantially similar to the manner of attachment described wherein said third sheet is fixedly attached to said second sheet whereby a fourth sheet is attached to said third sheet each successive sheet of said plurality of sheets is attached to the preceding sheet in said manner.

7. A device in accordance with claim 6 wherein said clip comprising said base and said clip member consists of a single molded piece of plastic.

8. A device in accordance with claim 6 wherein said base is constructed of plastic and said clip member is fixedly attached to said base.

9. A device in accordance with claim 6 wherein said pocket is perpendicular to the longitudinal axis of said clip member.

10. A device in accordance with claim 6 wherein said pocket is parallel to the longitudinal axis of said clip member.

11. A devices intended for removable attachment to an automobile sun visor wherein provision is made for a pocket specifically intended for safe and convenient storage of a standard plastic access card;

said device comprising a plurality of plastic sheets and a clip, said plurality of plastic sheets comprising at least one second and one third plastic sheet, said clip comprising a base and a clip member projecting from said base;

said base being substantially rectangular in aggregate perimeter with at least one substantially linear edge, possessing first and second planar surfaces and a width and a length approximating, respectively, the width and length of a standard plastic access card and further possessing a substantially constant thickness at least as great as the thickness of a said standard access card;

said clip member-projecting from said first surface of said base, possessing a thickness of a lesser dimension than width further possessing an arcuate portion proximate the juncture with said base and a substantially planar portion extending from said arcuate portion at a small inclination with respect to said first surface of said base, terminating in an edge proximate one said linear edge of said base;

said clip member thereby possessing a flexibility comparative with respect to and in a direction normal to said base sufficient to admit the width of a typical automobile sun visor and a resilience in the direction normal to said base sufficient to retain said device in a position of removable attachment to said automobile sun visor;

each of said plurality of plastic sheets being substantially rectangular in shape, each having first and second opposed planar surfaces and four substantially linear edges, each said sheet further possessing a width at least as great as the width of a standard plastic access card and a thickness less than the thickness of said standard access card;

said second plastic sheet possessing both a width and a length approximating the width and length of said base and disposed in planar alignment with said base, facing and fixedly attached to said second surface of said base, said third plastic sheet disposed in planar alignment with said second sheet facing said second surface of said second sheet and having at least two opposed edges each attached to an aligned edge of said second sheet, at least one edge of said third sheet having a free linear dimension at least equal to the width of a standard access card thus providing an aperture into said pocket between said second and third plastic sheets.

12. A device in accordance with claim 11 wherein said clip comprising said base and said clip member consists of a single molded piece of plastic.

13. A device in accordance with claim 11 wherein said base is constructed of plastic and said clip member is fixedly attached to said base.

14. A device in accordance with claim 11 wherein said pocket is perpendicular to the longitudinal axis of said clip member.

15. A device in accordance with claim 11 wherein said pocket is parallel to the longitudinal axis of said clip member.

16. A device in accordance with claim 11 further possessing a first plastic sheet wherein a plurality of pockets in planar alignment each appropriate for the storage of an access card substantially similar to said pocket between said second surface of said second sheet and said first surface of said third sheet are provided by the attachment of plastic sheets additional to said first, second and third sheets in a manner substantially similar to the manner of attachment described wherein said third sheet is fixedly attached to said second sheet whereby a fourth sheet is attached to said third sheet each successive sheet of said plurality of sheets is attached to the preceding sheet in said manner.

17. A device in accordance with claim 16 wherein said clip comprising said base and said clip member consists of a single molded piece of plastic.

18. A device in accordance with claim 16 wherein said base is constructed of plastic and said clip member is fixedly attached to said base.

19. A device in accordance with claim 16 wherein said pocket is perpendicular to the longitudinal axis of said clip member.

20. A device in accordance with claim 16 wherein said pocket is parallel to the longitudinal axis of said clip member.

* * * * *